March 13, 1934.  P. F. FIENE  1,951,237
DISHWASHING DEVICE
Filed Nov. 7, 1932  3 Sheets-Sheet 1

Inventor
P. F. Fiene
By Mawhinney & Mawhinney
Attorneys

March 13, 1934.  P. F. FIENE  1,951,237
DISHWASHING DEVICE
Filed Nov. 7, 1932   3 Sheets-Sheet 3
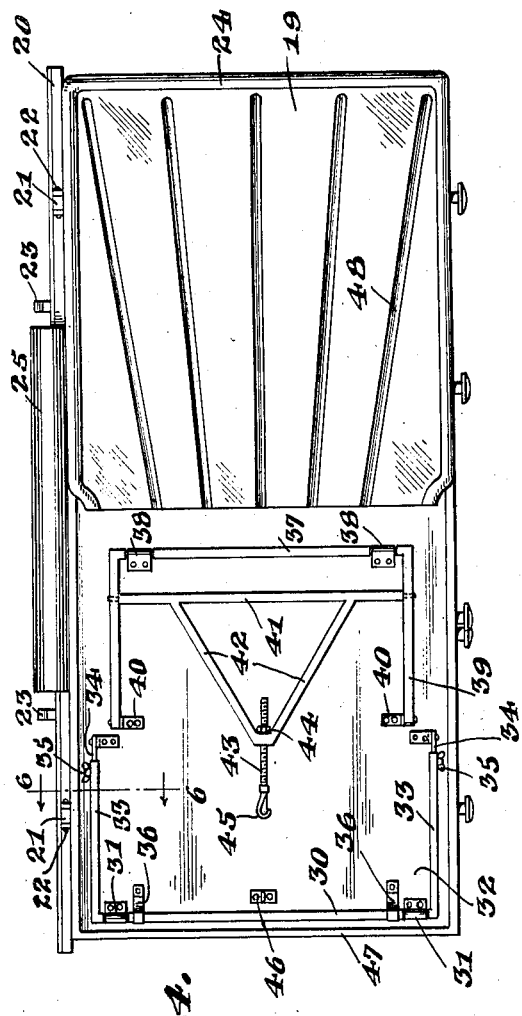
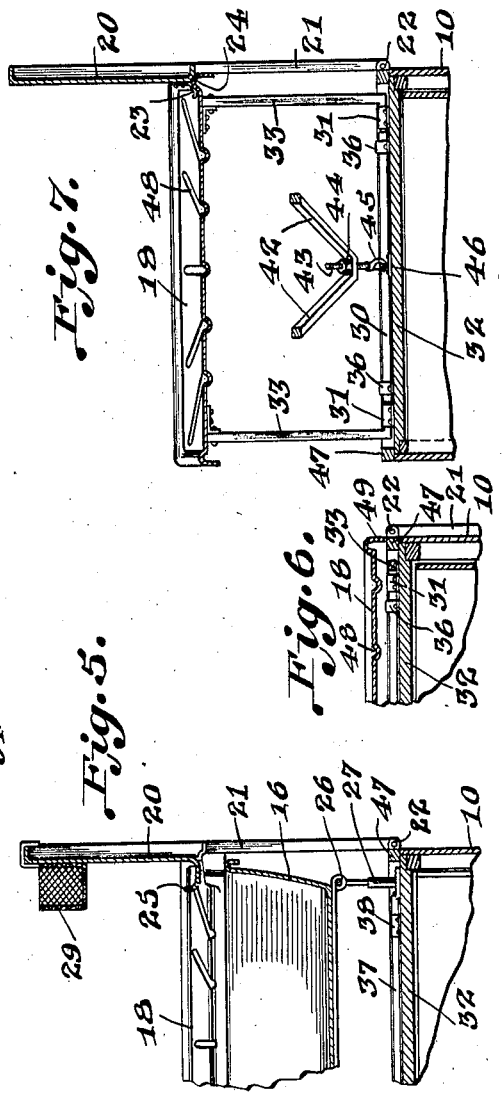
Inventor
P. F. Fiene Patented Mar. 13, 1934

1,951,237

UNITED STATES PATENT OFFICE 1,951,237

DISHWASHING DEVICE

Paul F. Fiene, Charter Oak, Iowa

Application November 7, 1932, Serial No. 641,627

4 Claims. (Cl. 141—9)

The present invention relates to improvements in dishwashing devices and has for an object to provide a device of this character which may be incorporated in a kitchen cabinet and which may be wheeled about from place to place, adjusted as to elevation in order to make the operations performed thereon convenient to the height of the user, and which is of compact and inexpensive construction.

Another object of the invention is to provide an improved kitchen cabinet in which devices for washing dishes are collapsibly arranged with reference to the top of the cabinet so that the same may be moved into and out of place with facility.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front elevation of an improved kitchen cabinet constructed in accordance with the present invention and with the drain boards and dish washing apparatus in position for use.

Figure 1ª shows a cross section of a detail.

Figure 4 is a top plan view of the cabinet with one of the drain boards removed and showing the parts in the collapsed position.

Figure 5 is a fragmentary vertical section taken on the line 5—5 in Figure 1.

Figure 6 is a similar view taken on the line 6—6 in Figure 4, and

Figure 7 is also a transverse vertical section taken on the line 7—7 in Figure 1.

Figure 1:
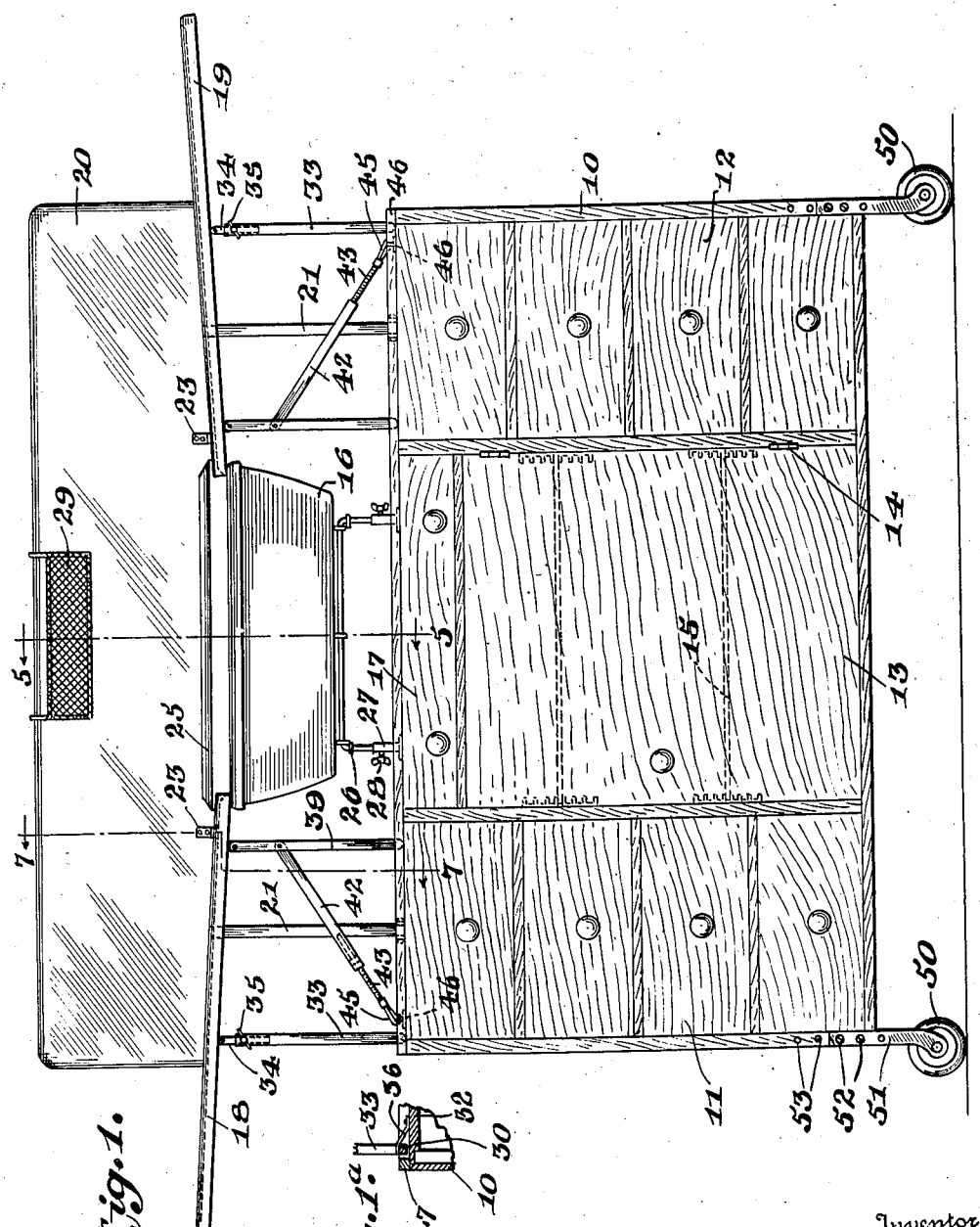

Referring more particularly to the drawings, the cabinet body is designated generally at 10 having tiers of drawers 11 and 12, in which various utensils useful about a kitchen may be kept. The center portion of the cabinet may be provided with a door 13 hinged as at 14 and giving access to interior compartments which contain adjustable shelves 15 for receiving a dish pan 16, its adjustable support, wire racks, etc. Above this cupboard space is a central drawer 17 for containing forks, knives, etc.

At 18 and 19 are shown drain boards and at 20 a splash board. The splash board is held upon arms 21 which are hinged or pivoted, as indicated at 22, to the cabinet for permitting the splash board 20 to fold down behind the cabinet to the position shown in Figure 2, or be raised to the position shown in Figures 1, 5 and 7.

The splash board 20 carries spring clips 23, shown in Figure 7, which spring clips snap over the beaded rear edges 24 of the drain boards 18 and 19. A trough 25 is formed centrally upon the splash board 20 for catching drainage and directing same at opposite sides to the drain boards 18 and 19. Such drain boards 18 and 19 incline downwardly toward the basin 16 which is supported in an elevated position by an appropriate supporting rack or cradle 26 provided with telescoping feet 27 for adjustment, the adjustment being preserved by set screws 28.

The splash board 20 is shown as carrying a wire rack 29 adapted to hang or clamp over the top of the splash board above the dish pan. This wire rack is adapted to contain the unwashed forks, knives, spoons, etc.

The drain boards 18 and 19 are held in an inclined position when raised by means of the collapsible frames beneath same. These collapsible frames are more particularly shown in Figures 1 and 4. Each drain board virtually has two such frames. The outer frame is composed of a square cross bar 30 having rounded portions journalled in the bearings 31 affixed to the top 32 of the cabinet. At its ends the bar 30 carries legs 33 hollow at their outer portions to telescopingly receive bars 34 pivotally affixed to the undersides of the drain boards. Butterfly nuts and bolts 35 may be employed to hold the telescoping parts in adjusted position. By adjusting the bars 34 in or out of the legs 33, the inclination of the drain boards may be varied at will.

As shown more particularly in Figures 1ª and 4, spring keepers 36 are secured to the cabinet top 32 and bear upon the flat bar 30 so as to effectively hold the legs 33 in either a raised position, as shown in Figure 1ª, or a lowered position, as shown in Figure 4.

The inner frames are composed of cross bars 37 having trunnions rotatably mounted in bearings 38 secured to the drain boards 18 and 19 and carrying legs 39 with swivel clamps 40 secured to the cabinet top.

Figure 2:
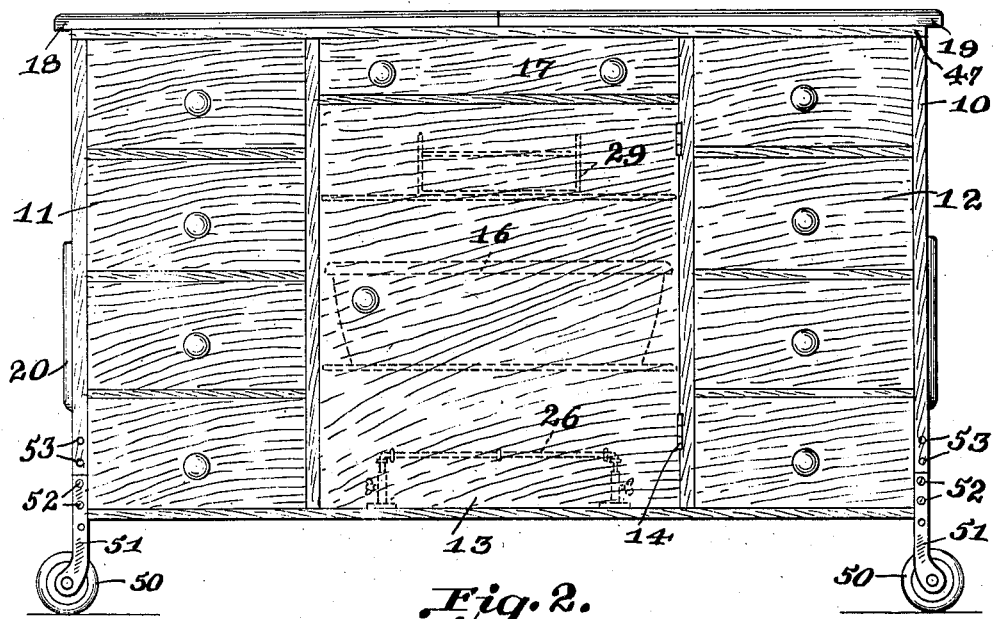
Figure 2 is a front elevation of the cabinet in the collapsed position.
Figure 3:
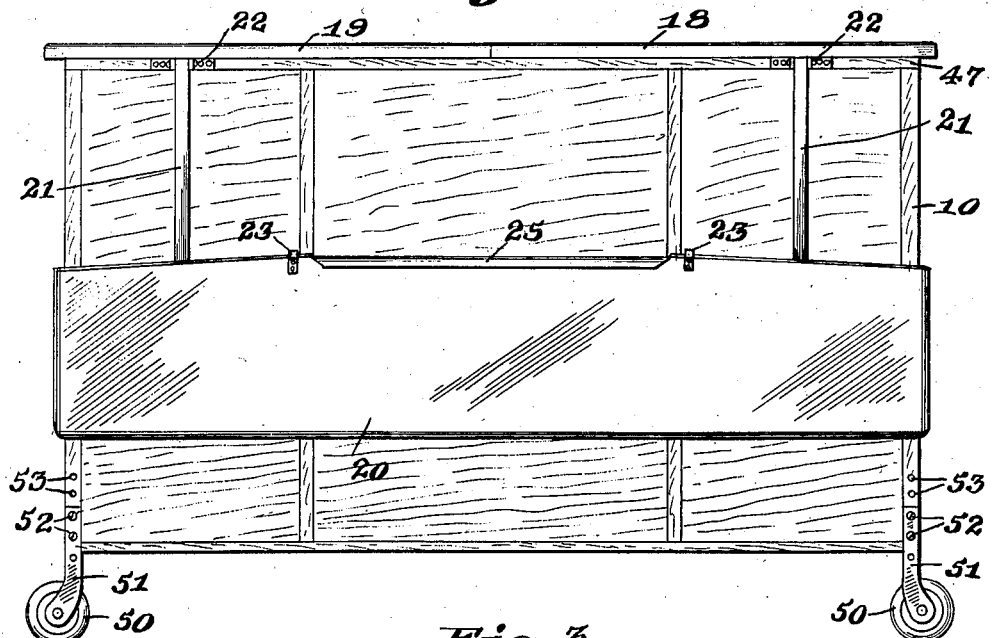
Figure 3 is a rear view of the same.

The legs 39 swivelly carry a cross rod 41 having V-shaped braces 42 connecting adjustably with a screw rod 43 having an adjusting nut 44 and a snap hook 45 or the like upon its outer end positioned and adapted to engage the eye 46 upon the top of the cabinet 32 adjacent the bar 30. The drain boards are adapted to collapse downwardly and inwardly so that the inner ends come together, as indicated in Figures 2 and 3. When the drain boards are raised, the frames swing upwardly and outwardly and the same are maintained in this raised position by engaging the snap hooks 45 with the eyes 46. The members 41, 42 and 43 then constitute diagonal braces, as indicated in Figure 4, reinforcing the structure and stabilizing the drain boards.

As shown in Figure 1ª and Figure 4, the collapsible frames are adapted to fold down upon the cabinet top 32 and within a margin rail 47. The drain boards are preferably made out of metal properly corrugated or fluted to provide draining channels 48 and having depending flanges 49 at their marginal edges to seat upon the marginal rails 47, as shown in Figure 6, or such flanges 49 may extend over the rails 47 to obscure the same when the drain boards are in the lowered position.

The cabinet is mounted upon wheels or casters 50 which casters have shanks 51 affixed adjustably as to elevation by means of screws or other fastenings 52 engaging with a series of openings 53 in the cabinet body 10.

In the use of the device, the cabinet may be rolled over to the dining table, the unwashed dishes being loaded on the drain boards 18 and 19 and the unwashed forks, knives, spoons, etc. placed in the wire rack 29. The whole load is then relegated to a convenient place in the kitchen. Here the drain boards 18 and 19 may be elevated and the basin 16 removed from the cupboard and put in place as shown in Figure 1. The operation of washing the dishes is then conducted. By the adjustment of the casters 50, the portable dish washing sink may be made of convenient height to suit the user. The dishes are washed in the sink or dish pan 16, such dishes being placed upon the drain boards 18 and 19, the water draining therefrom back into the dish pan 16. Any water splashed upon the splash board 20 will drain down directly to the drain boards 18 and 19 or to the trough 25 and thence to the drain boards. The screw rods 43 allow for some adjustment of the position of the drain boards thereby widening or narrowing the space between the drain boards, which space is reserved for the dish pan.

The dish pan is also adjustable as to height by virtue of the adjustability of its iron frame 26. This adjustment may be made in many ways.

The unwashed dishes may be loaded on the drain boards 18 and 19 after the same have been elevated or before but preferably afterwards.

It will be obvious that various changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:

1. In a dishwashing device, a supporting structure, drain boards, collapsible means connected to said drain boards and to the top of said supporting structure for effecting the raising and lowering of said drain boards and for supporting said drain boards in elevated position, a splash board pivoted on said supporting structure, and retaining means on said splash board for connecting the latter with the drain boards in the elevated position of both.

2. In a dishwashing device, a supporting structure, drain boards, collapsible means connected to said drain boards and to the top of said supporting structure for effecting the raising and lowering of said drain boards and for supporting said drain boards in elevated position with their ends separated, a drain basin disposed between the separated ends of the elevated drain boards, a rack for supporting said basin, and means for adjusting the height of said rack.

3. In a dishwashing device, a supporting structure, drain boards forming the normal top of the supporting structure, collapsible means connecting said drain boards to the supporting structure and including inner and outer legs pivoted to the respective drain boards and the supporting structure, and adjustable means for changing the effective length of the outer legs to vary the inclination of the drain boards.

4. In a dishwashing device, a supporting structure, drain boards thereon, each board having thereunder inner and outer frame members, the outer frame member composed of a flat transverse bar rotatably journalled on the supporting structure, legs extending angularly from said bar, rods telescoping with said legs and pivoted to the under-portions of the drain boards, flat springs bearing on the flat cross bar for holding the legs in raised and lowered positions, the inner frame member composed of a cross bar rotatably journalled on the drain board and having legs connected to the supporting structure, a cross bar swivelly mounted on said legs, an adjustable turn buckle carried by the cross bar, and an eyelet on the supporting structure for detachable engagement with the turnbuckle.

PAUL F. FIENE.